(12) United States Patent
Yun et al.

(10) Patent No.: US 9,942,775 B2
(45) Date of Patent: Apr. 10, 2018

(54) SIGNAL LOCALIZATION AND MAPPING

(71) Applicant: Spectrum Effect Inc., Seattle, WA (US)

(72) Inventors: Jungnam Yun, Seattle, WA (US); Rekha Menon, Seattle, WA (US)

(73) Assignee: SPECTRUM EFFECT INC., Seattle, WA (US)

( * ) Notice: Subject to any disclaimer, the term of this patent is extended or adjusted under 35 U.S.C. 154(b) by 58 days.

(21) Appl. No.: 14/827,226

(22) Filed: Aug. 14, 2015

(65) Prior Publication Data
US 2017/0064564 A1 Mar. 2, 2017

Related U.S. Application Data

(60) Provisional application No. 62/037,555, filed on Aug. 14, 2014.

(51) Int. Cl.
| | |
|---|---|
| H04W 24/00 | (2009.01) |
| H04W 16/22 | (2009.01) |
| H04B 17/318 | (2015.01) |
| H04W 4/02 | (2018.01) |
| H04W 24/02 | (2009.01) |
| H04B 17/345 | (2015.01) |
| H04W 88/02 | (2009.01) |
| H04W 24/04 | (2009.01) |
| H04W 24/10 | (2009.01) |

(52) U.S. Cl.
CPC .......... *H04W 16/22* (2013.01); *H04B 17/318* (2015.01); *H04B 17/345* (2015.01); *H04W 4/026* (2013.01); *H04W 24/02* (2013.01); *H04W 24/04* (2013.01); *H04W 24/10* (2013.01); *H04W 88/02* (2013.01)

(58) Field of Classification Search
CPC ....... H04W 64/00; H04W 4/02; H04W 24/00; H04W 24/08
USPC ......... 455/456.1, 226.1, 226.2, 226.3, 67.11, 455/67.13
See application file for complete search history.

(56) References Cited

U.S. PATENT DOCUMENTS

| | | | | |
|---|---|---|---|---|
| 8,229,368 B1 * | 7/2012 | Immendorf | ........... | H04W 24/10 455/63.1 |
| 9,747,663 B2 * | 8/2017 | Barnes | .................. | G06T 3/0093 |
| 2006/0267833 A1 * | 11/2006 | Langford | .............. | G01S 5/0252 342/174 |
| 2011/0039554 A1 * | 2/2011 | Bims | ..................... | H04L 1/0033 455/434 |

* cited by examiner

*Primary Examiner* — Temica M Beamer

(57) ABSTRACT

Transmitter localization and signal mapping may be accomplished by receiving measurement data from a plurality of nodes, the measurement data including a signal strength value and a geographic location for the signal strength value, triangulating the plurality of measurements using triangulation, and establishing at least one contour representing a level of signal strength. A system may receive measurement data from a plurality of user equipment, and use that data to localize an interference source and create a contour map.

18 Claims, 6 Drawing Sheets

SIGNAL LOCALIZATION AND MAPPING

CROSS-REFERENCES TO RELATED APPLICATIONS

The present invention claims priority to U.S. Provisional Application No. 62/037,555, filed Aug. 14, 2014, which is incorporated by reference herein for all purposes.

BACKGROUND OF THE INVENTION

Interference localization and characterization are useful techniques for optimizing performance of a communications system. Identifying the levels of interference in various areas can help a telecommunications system to adapt parameters to avoid that interference. Similarly, localizing an interference source can be useful to a network for optimizing performance, as well as to operators for identifying s signal source.

Interference localization and characterization can be challenging in real world environments. Simple triangulation techniques do not account for variations in geography and urban density, and measurement error is relatively high. Error of a few degrees can translate into hundreds of meters across the coverage area of a macrocell. While User Equipment (UE) can function as interference detection beacons, the sporadic distribution and limited number of UE that are available for interference measurement purposes are typically insufficient to establish a high resolution map of interference distribution using conventional techniques. Interference localization and characterization technology can benefit from a mechanism that uses a limited amount of data in an uncontrolled environment to localize a source of interference and characterize interference levels over a geographic area.

BRIEF SUMMARY OF THE INVENTION

Embodiments of the present disclosure relate to characterizing a signal pattern by creating a contour map showing distribution of signal strength and localizing a source of the signal. The system and method described by this disclosure improve signal pattern characterization technology in a communications network by improving the accuracy of signal strength characterization using a limited amount of signal measurements.

In an embodiment, a method for characterizing interference detected by distributed measurement nodes includes collecting signal data from a plurality of measurement nodes, the signal data including a signal strength measurement and a geographic location for the signal strength measurement, triangulating the geographic locations of the plurality of measurement nodes using Delaunay triangulation to create a plurality of triangles, and establishing at least one contour by connecting a plurality of coordinates along sides of the plurality of triangles. In addition, the method may include localizing a source of the interference by averaging the plurality of coordinates to determine a single geographical coordinate value that corresponds to a location of the source of interference.

The geographic location may include a latitude coordinate and a longitude coordinate of the corresponding signal strength measurement, and each signal strength measurement may be an average value of a plurality of signal strength measurements.

In an embodiment, the at least one contour is a plurality of contours, and the method further includes rendering the plurality of contours on a graphical media such as a computer monitor or a printed paper in the form of a contour map of a signal strength pattern.

Establishing the at least one contour may include determining a difference between a high measurement value and a low measurement value, determining a number N of contours based on a number of measurements indicating the presence of a signal, and determining a contour step by dividing the difference between the high and low measurement values by N. Establishing the at least one contour may further include identifying each triangle side with a first end point that is greater than a first contour level and a second end point that is less than the first contour level, and interpolating the identified triangle sides based on the values of the first and second end points.

The signal strength measurements may be taken by omnidirectional antennas. When sufficient omnidirectional antenna measurements are available, they may be used over directional antenna measurements.

A wireless communication system parameter may be adapted based on the at least one contour. Thus, a result of the contour mapping or interference localization may drive a change to network parameters, which may adapt to improve network performance in the presence of interference. The wireless communication system parameter may be at least one of an antenna pointing direction and a transmit power.

Embodiments of the present disclosure include a wireless communications system which includes a network resource controller coupled to a backhaul portion of the communications system, and a plurality of base stations that transmit signal data to the network resource controller, the signal data including a signal strength value measured by a node chosen from the plurality of base stations and user equipment (UE) attached to at least one of the plurality of base stations, the signal data further including a geographic location where the signal strength value was measured. The network resource controller may be operative to triangulate the geographic locations of the signal data using Delaunay triangulation to create a plurality of triangles, and establish at least one contour by connecting a plurality of coordinates along sides of the plurality of triangles.

DETAILED DESCRIPTION OF THE INVENTION

Embodiments of this disclosure can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of embodiments is provided below along with accompanying figures. The scope of this disclosure is limited only by the claims and encompasses numerous alternatives, modifications and equivalents. Numerous specific details are set forth in the following description in order to provide a thorough understanding. These details are provided for the purpose of example and embodiments may be practiced according to the claims without some or all of these specific details. For the purpose of clarity, technical material that is known in the technical fields related to this disclosure are not described in detail so that the disclosure is not unnecessarily obscured.

Figure 1:
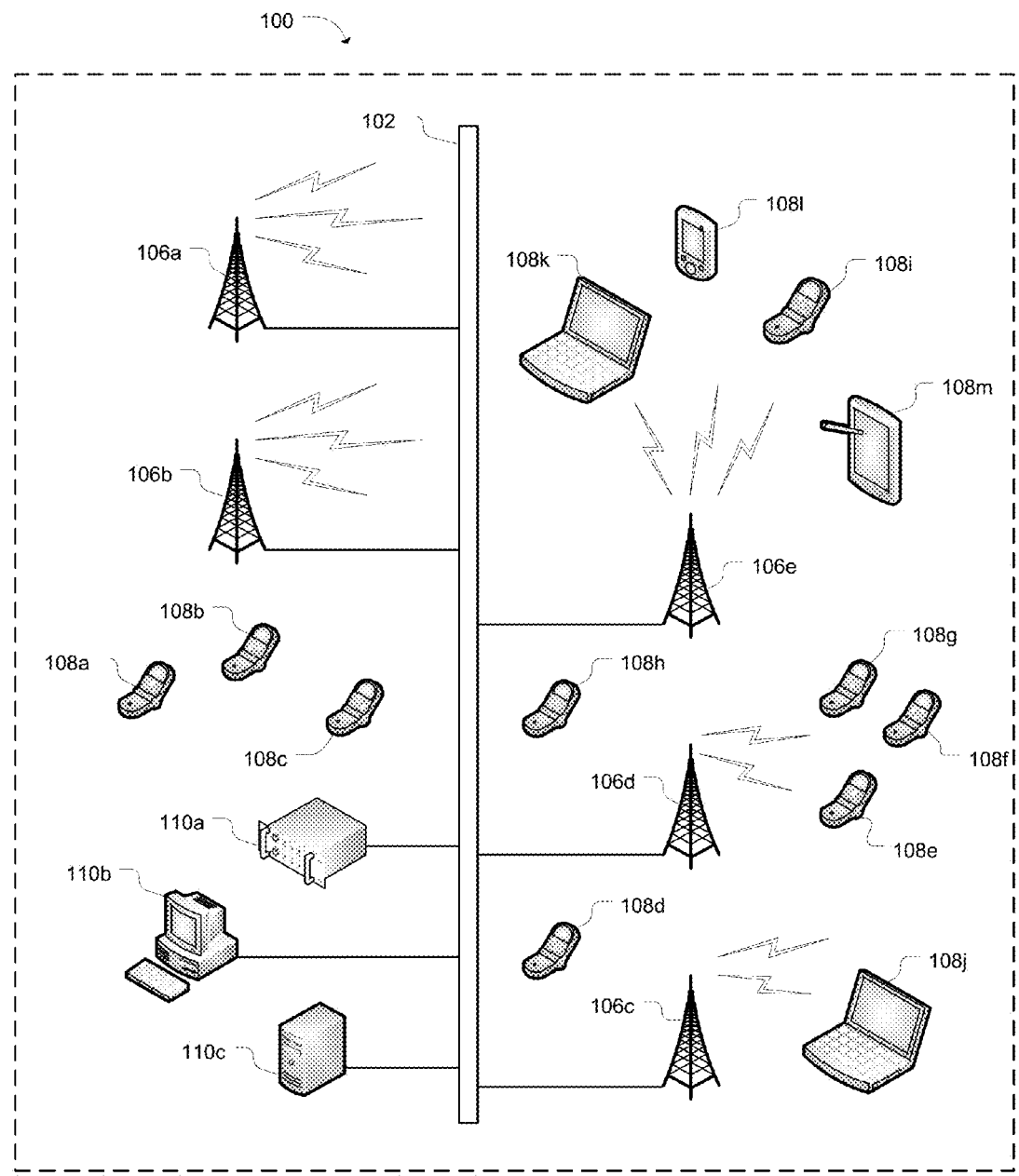
FIG. 1 illustrates a networked communications system 100 according to an embodiment.

FIG. 1 illustrates a networked communications system 100 according to an embodiment of this disclosure. As depicted, system 100 may include one or more base stations 106a-e, one or more network resource controller 110a-c, and one or more User Equipment (UE) 108a-m. As used herein, the term "base station" refers to a wireless communications station provided in a location and serves as a hub of a wireless network. The base stations may include macrocells, microcells, picocells, femtocells and access points.

In an embodiment of system 100, the system includes a backhaul portion 102 that can facilitate distributed network communications between any of the network controller devices 110a-c and any of the base stations 106a-e. Any of the network controller devices 110a-c may be a dedicated Network Resource Controller (NRC) that is provided remotely from the base stations or provided at the base station. Any of the network controller devices 110a-c may be a non-dedicated device that provides NRC functionality among others. The one or more UE 108a-m may include cell phone devices 108a-i, laptop computers 108j-k, handheld gaming units 108l, electronic book devices or tablet PCs 108m, and any other type of portable wireless computing device that may be provided with wireless communications service by any of the base stations 106a-e.

As would be understood by those skilled in the Art, in most digital communications networks, the backhaul portion 102 may include intermediate links between a backbone of the network which are generally wire line, and sub networks or base stations 106a-e located at the periphery of the network. For example, cellular user equipment (e.g., any of UE 108a-m) communicating with one or more base stations 106a-e may constitute a local sub network. The network connection between any of the base stations 106a-e and the rest of the world may initiate with a link to the backhaul portion 102 of a provider's communications network (e.g., via a point of presence).

In an embodiment, any of the network controller devices 110a-c and/or base stations 106a-e may function independently or collaboratively to implement processes associated with various embodiments of the present disclosure.

In accordance with a standard GSM network, any of the network controller devices 110a-c (NRC devices or other devices optionally having NRC functionality) may be associated with a base station controller (BSC), a mobile switching center (MSC), a data scheduler, or any other common service provider control device known in the art, such as a radio resource manager (RRM). In accordance with a standard UMTS network, any of the network controller devices 110a-c (optionally having NRC functionality) may be associated with a NRC, a serving GPRS support node (SGSN), or any other common network controller device known in the art, such as an RRM. In accordance with a standard LTE network, any of the network controller devices 110a-c (optionally having NRC functionality) may be associated with an eNodeB base station, a mobility management entity (MME), or any other common network controller device known in the art, such as an RRM.

In an embodiment, any of the network controller devices 110a-c, the base stations 106a-e, as well as any of the UE 108a-m may be configured to run any well-known operating system, including, but not limited to: Microsoft® Windows®, Mac OS®, Google® Chrome®, Linux®, Unix®, or any mobile operating system, including Symbian®, Palm®, Windows Mobile®, Google® Android®, Mobile Linux®, etc. Any of the network controller devices 110a-c, or any of the base stations 106a-e may employ any number of common server, desktop, laptop, and personal computing devices.

In an embodiment, any of the UE 108a-m may be associated with any combination of common mobile computing devices (e.g., laptop computers, tablet computers, cellular phones, handheld gaming units, electronic book devices, personal music players, MiFi™ devices, video recorders, etc.), having wireless communications capabilities employing any common wireless data communications technology, including, but not limited to: GSM, UMTS, 3GPP LTE, LTE Advanced, WiMAX, etc.

In an embodiment, the backhaul portion 102 of FIG. 1 may employ any of the following common communications technologies: optical fiber, coaxial cable, twisted pair cable, Ethernet cable, and power-line cable, along with any other wireless communication technology known in the art. In context with various embodiments of the invention, it should be understood that wireless communications coverage associated with various data communication technologies (e.g., base stations 106a-e) typically vary between different service provider networks based on the type of network and the system infrastructure deployed within a particular region of a network (e.g., differences between GSM, UMTS, LTE, LTE Advanced, and WiMAX based networks and the technologies deployed in each network type).

Figure 2:
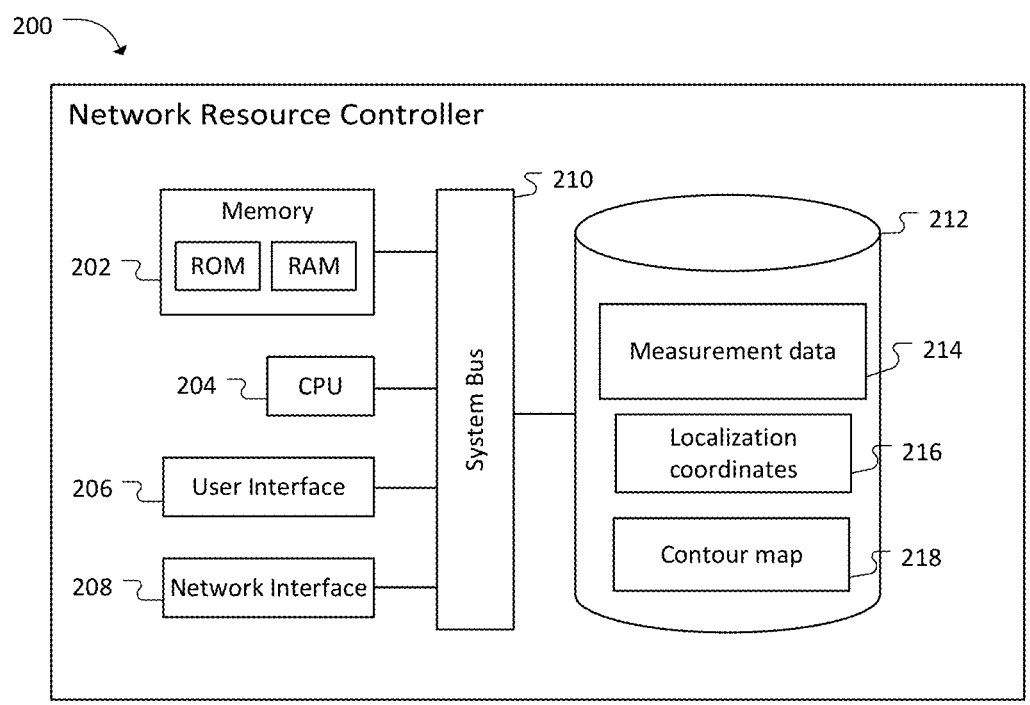
FIG. 2 illustrates a controller apparatus according to an embodiment.

FIG. 2 illustrates a block diagram of an NRC 200 that may be representative of any of the network controller devices 110a-c. Accordingly, NRC 200 may be representative of a Network Management Server (NMS) an Element Management Server (EMS), or a Mobility Management Entity (MME). In an embodiment, one or more of the network controller devices 110a-c are SON controllers. The NRC 200 has one or more processor devices including a CPU 204.

The CPU 204 is responsible for executing computer programs stored on volatile (RAM) and nonvolatile (ROM) memories 202 and a storage device 212 (e.g., HDD or SSD). In some embodiments, storage device 212 may store program instructions as logic hardware such as an ASIC or FPGA. Storage device 212 may store, for example, measurement data 214, localization coordinates 216, and a contour map 218.

The NRC 200 may also include a user interface 206 that allows an administrator to interact with the NRC's software and hardware resources and to display the performance and operation of the system 100. In addition, the NRC 200 may include a network interface 206 for communicating with other components in the networked computer system, and a system bus 210 that facilitates data communications between the hardware resources of the NRC 200.

In addition to the network controller devices 110*a-c*, the NRC 200 may be used to implement other types of computer devices, such as an antenna controller, an RF planning engine, a core network element, a database system, or the like. Based on the functionality provided by an NRC, the storage device of such a computer serves as a repository for software and database thereto. In a system that uses a technology other than cellular telecommunications, NRC 200 may be a central or distributed computing system that performs one or more element of the processes described in this disclosure.

Figure 3:
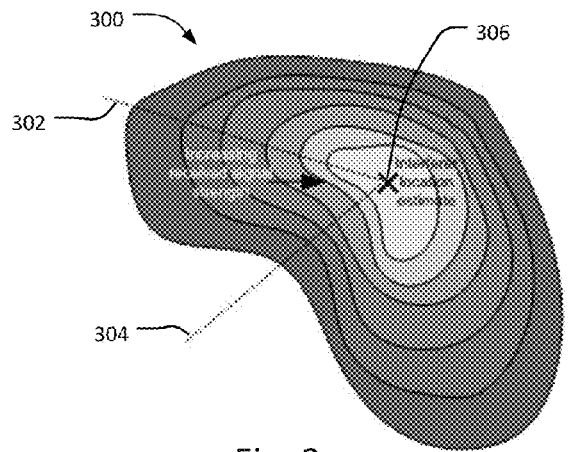
FIG. 3 illustrates a signal strength contour map according to an embodiment.

FIG. 3 shows an interference pattern 300, in which darker areas indicate lower levels of interference, and lighter levels indicate higher levels of interference as the source of interference is approached. The interference pattern is irregular and amorphous, and as such it cannot be accurately characterized by a very small amount of data. Such a shape could be accurately characterized by a large number of data points spaced at regular intervals, but such data is rarely available in a wireless coverage area.

Since received power measurements in general reduce with increasing distance from the source, contours of the signal power measurements can be seen to increase in a radial manner from the location of the interferer. The foci 302 and 304 of the contours should therefore, provide an estimate 306 of the location of the interferer.

The use of isotropic receive antennas makes it easier to obtain a representation of the interference pattern 300 since it removes the dependency of the received power measurements on the pointing directions of the antennas and allows them to be expressed a function of distance from the source. Isotropic antennas are present, for example, on certain small cell nodes in a cellular network, and access points in a Wi-Fi network. Handheld User Equipment (UE) are typically equipped with isotropic antennas.

In order to characterize an interference pattern 300 using conventional techniques, a relatively large number of data points or receive nodes would be required. In general, the more data points that are available, the more accurately the pattern can be characterized. However, because of the amorphous shape of pattern 300, a large number of data points would be conventionally needed in order to resolve the various lobes that define foci 302 and 304.

The shape of the received signal contours of interference pattern 300 depends upon the terrain as well as the transmit antenna pattern of the interferers. In an embodiment, if the influence of terrain can be isolated, the contours can also be used to infer information about the transmit antenna pattern which may be useful in the classification of the interference source.

Note that the lognormal shadowing effects in the signal strength measurements affect the localization accuracy of the technique. Localization accuracy is also influenced by the geometry of the interferer location with respect to the receive nodes. More accurate results may be obtained when the interferer is surrounded by receive nodes.

Figure 4:
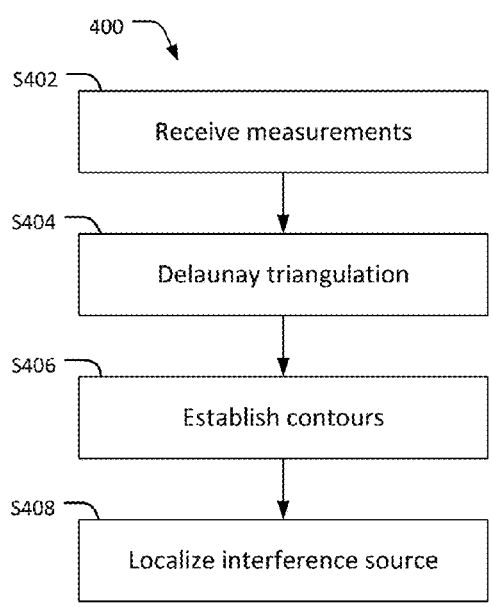
FIG. 4 illustrates an embodiment of a process of characterizing and localizing interference in a communications network according to an embodiment.

FIG. 4 illustrates a process 400 of characterizing and localizing interference in a communications network. Process 400 can be performed by a communications system using signal strength and location data for a plurality of locations. Although this disclosure describes embodiments with respect to a cellular telecommunications system, other embodiments can be employed by other multi-node systems such as a Wi-Fi system. In a cellular telecommunications system, process 400 may be performed by a centralized SON server.

Measurements are received by the system at S402. The measurements may include signal strength measurements and geographic location measurements. For example, in an LTE telecommunications system, Received Signal Strength Indicator (RSSI) and GPS data from multiple UE may be received at S402. Delaunay triangulation is performed on a grid of the measured point data at S404. A contour map is generated using the triangles at S406, and the contour map can be used to localize an interference source at S408.

Figure 5:
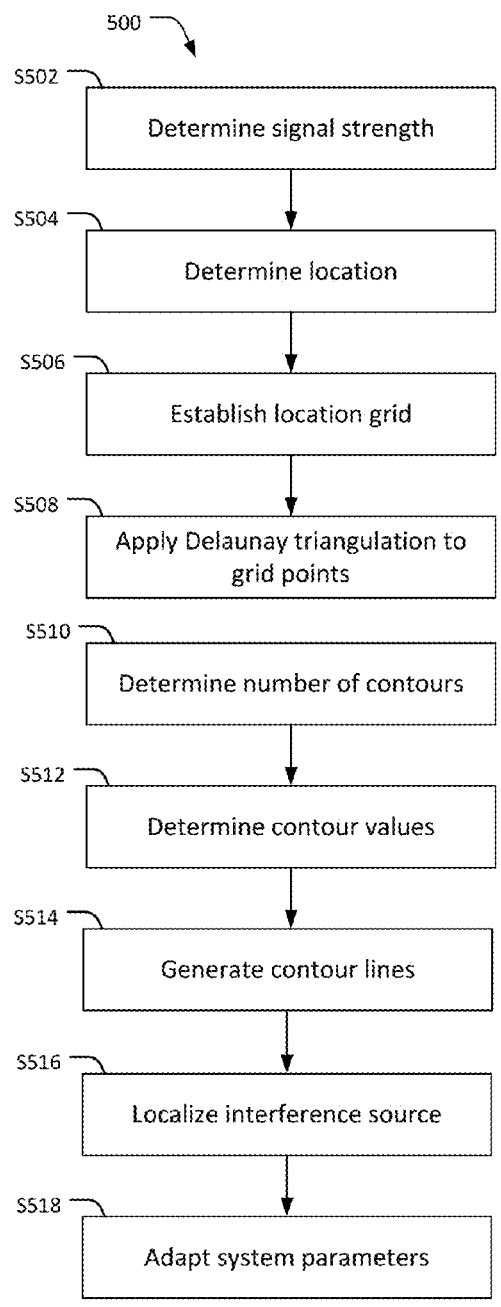
FIG. 5 illustrates an embodiment of a process 400 of characterizing and localizing interference in a communications network according to an embodiment.

FIG. 5 illustrates a more detailed process 500 of characterizing and localizing interference. Steps of process 500 correspond to the steps of process 400, but process 500 is a more specific implementation that will be described in a higher level of detail.

Signal strength is determined at S502. Signal strength may be measured at a number of locations in a geographical area. One example of measuring signal strength is a RSSI measurement performed by a UE in a cellular telecommunications system. Such measurements are performed routinely by UE in the normal course of operation. However, in an embodiment, a signal strength measurement may be performed specifically to provide data for interference characterization and localization in accordance with process 500.

Sources of signal strength measurements are not limited to UE. Any apparatus that can measure radio signal strength can be used to collect data, including a cellular base station, a Wi-Fi access point, etc. In general, the accuracy of interference characterization and localization improves with the amount of measurement data, so it is desirable to gather data from as many sources as possible.

Signal strength measurements may be conducted and reported by nodes at regular intervals to support activities not related to detection and localization of an interference source. In other embodiments, a plurality of nodes may be caused to conduct measurements for interference characterization and localization. For example, a central controller computer such as a SON server may transmit an instruction signal to one or more base station, which relay the instruction signal to UE to conduct measurements in accordance with S502.

Location data for the signal strength measurements of S502 is determined at S504. S502 may be performed using an average of a plurality of signal strength measurements to reduce the influence of fast fading channel effects on the data. However, lognormal shadowing effects and penetration losses may be present for receivers. Thus, in an embodiment, data from certain receivers may be weighted according to certain known characteristics of an associated receive antenna, such as whether a receiver is located in a dense urban zone, an outdoor or indoor location, etc. For example, a femtocell base station in an office building may suffer from wall penetration loss more than a femtocell base station in an outdoor location, so data from the outdoor location may be weighted higher than data from the indoor location.

When signal strength measurements are conducted by handheld cellular devices, location data such as GPS data may be received from the cellular devices at S504. In another embodiment, locations for the measurements may be determined using other techniques such as triangulation or trilateration based on data from multiple base stations, or estimated using any available data.

Figure 6:
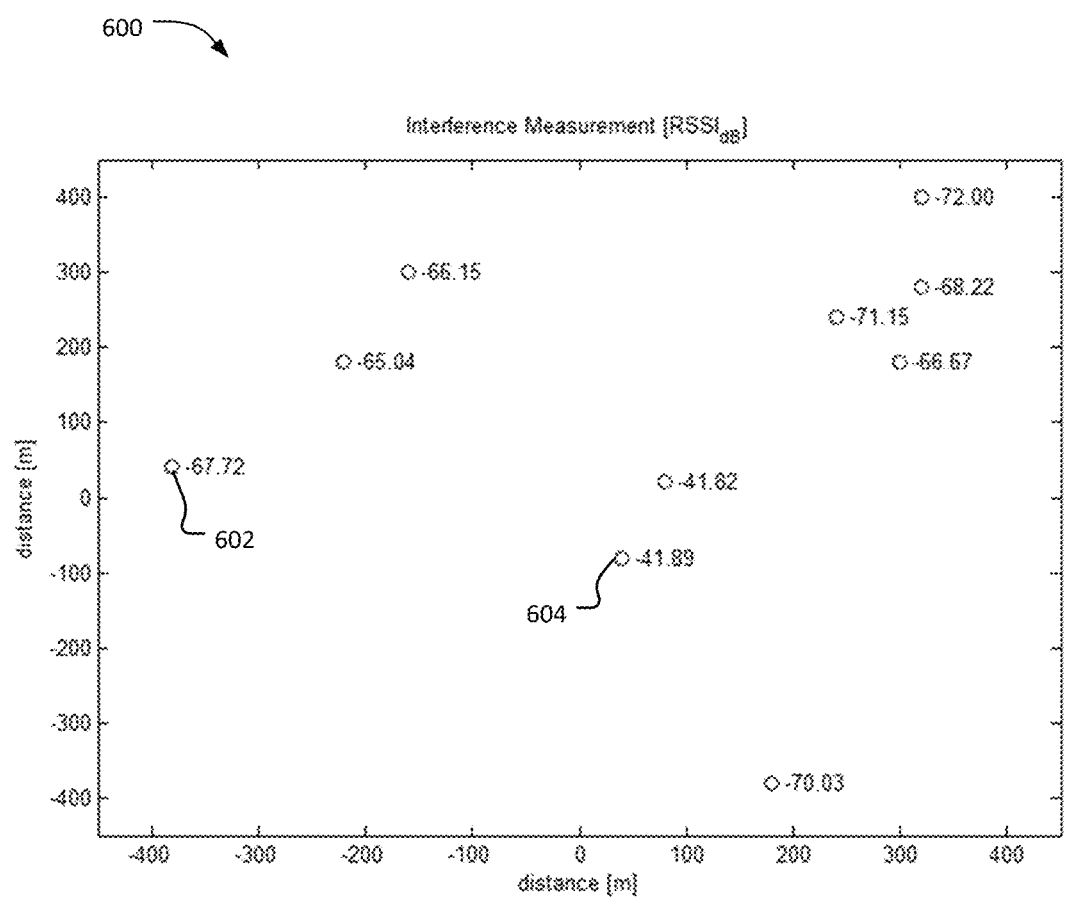
FIG. 6 illustrates signal strength measurements according to an embodiment.

A location grid is established at S506, which will be explained with reference to grid 600 shown in FIG. 6. FIG. 6 shows a location grid 600 which includes a plurality of data points 602. Each data point 602 includes a geographical location and a signal strength value. The numbers adjacent to the circles of FIG. 6 represent signal strength values, while geographic locations of the data points 602 correspond to X and Y-axis coordinate values.

In FIG. 6, the origin point, or the point at which the X and Y-axis coordinates are zero, is the location of the interference source. However, such a grid cannot normally be established unless the origin of the interference is known, so the specific values shown in FIG. 6 do not represent a typical scenario. In an embodiment, the X and Y-axis coordinates are expressed as longitudinal and latitudinal values.

One element of establishing a location grid S506 is determining the boundaries of the grid, or determining the area in which interference is present. Determining the area in which interference is present may be accomplished by comparing signal strength values to a threshold value. A number of measurements that exceed the threshold value within a predetermined geographic area may indicate the presence of an interference source, so the area may be used to determine boundaries of the grid. The area may be a predetermined area that is the same for each grid. In another embodiment, the area is different for each interference detection, and is determined for each instance of interference based on the location of measurement data that indicates the presence of interference.

Mapping coordinates to a grid at S506 may result in a visual representation of an interference distribution. Such a visual representation, which could be viewed on an electronic viewing apparatus such as a computer monitor, could be used by operators to infer or deduce certain information about an interferer.

For example, the distribution of an interference pattern can be cross-referenced with known geography to pinpoint an origin of the interference. In an embodiment, the shape of interference pattern 300 can be compared to cell coverage areas to determine appropriate steps for mitigating interference. In embodiments in which a visual representation of interference is desired, such representation may be performed after a contour map and/or interference source is determined. However, some embodiments may not create a visual representation of interference.

Figure 7:
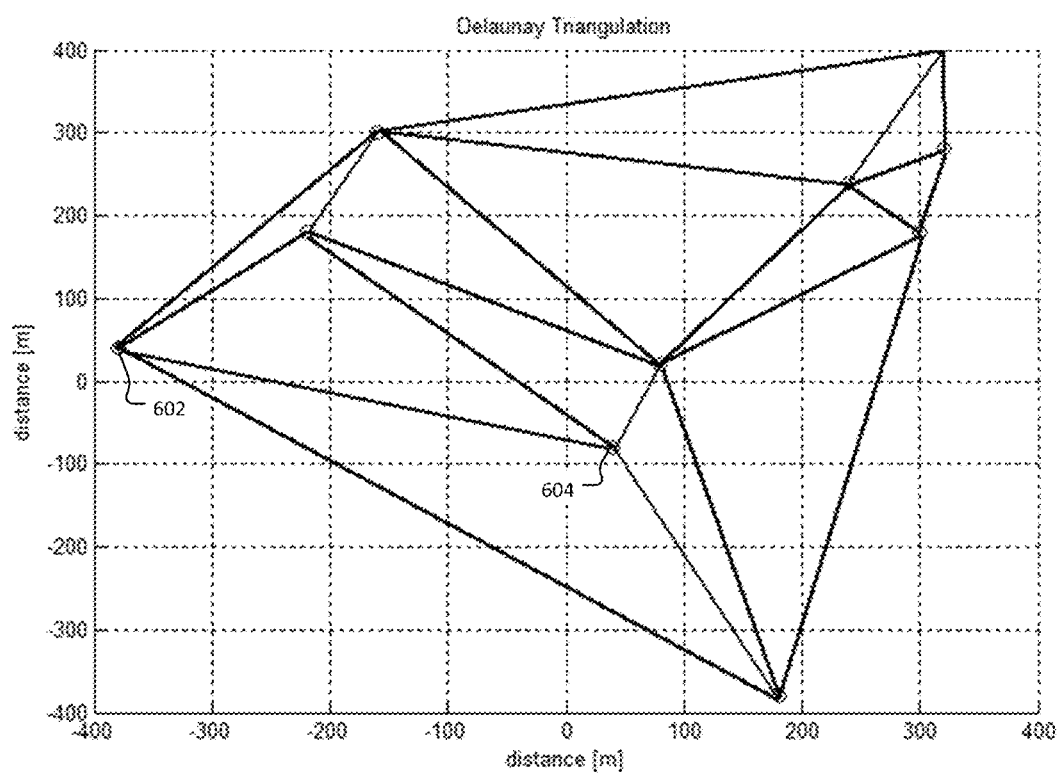
FIG. 7 illustrates Delaunay triangulation according to an embodiment.

Triangulation is applied to the data points at S508. In an embodiment, the triangulation technique is Delaunay triangulation. Delaunay triangulation is a known technique in which no point that is used for triangulation is located inside a circumcircle of a triangle of other points. The triangle mesh that results from Delaunay triangulation tends to maximize minimum angles to avoid highly acute triangles. FIG. 7 shows a result of performing Delaunay triangulation on the data points of FIG. 6.

A number of contours may be determined at S510. The number of contours can be determined in multiple ways, but will generally be constrained by the number of data points. A small number of data points cannot support a large number of contour lines with accuracy, while a large number of data points can facilitate an accurate and detailed map. The number of contours may be a fraction of the number of data points, such as the number of data points divided by an integer such as 3. In other embodiments, the number of contours can be determined based on the number of data points using another technique. In still another embodiment, the number of contours may be a static value such as two, three, or five.

The values of contour lines are determined at S512. In one embodiment, the values of contour lines are determined by identifying the highest and lowest signal strength values, finding the difference between those values, and dividing the difference by n+1, where n is the number of contours from S510.

Figure 8:
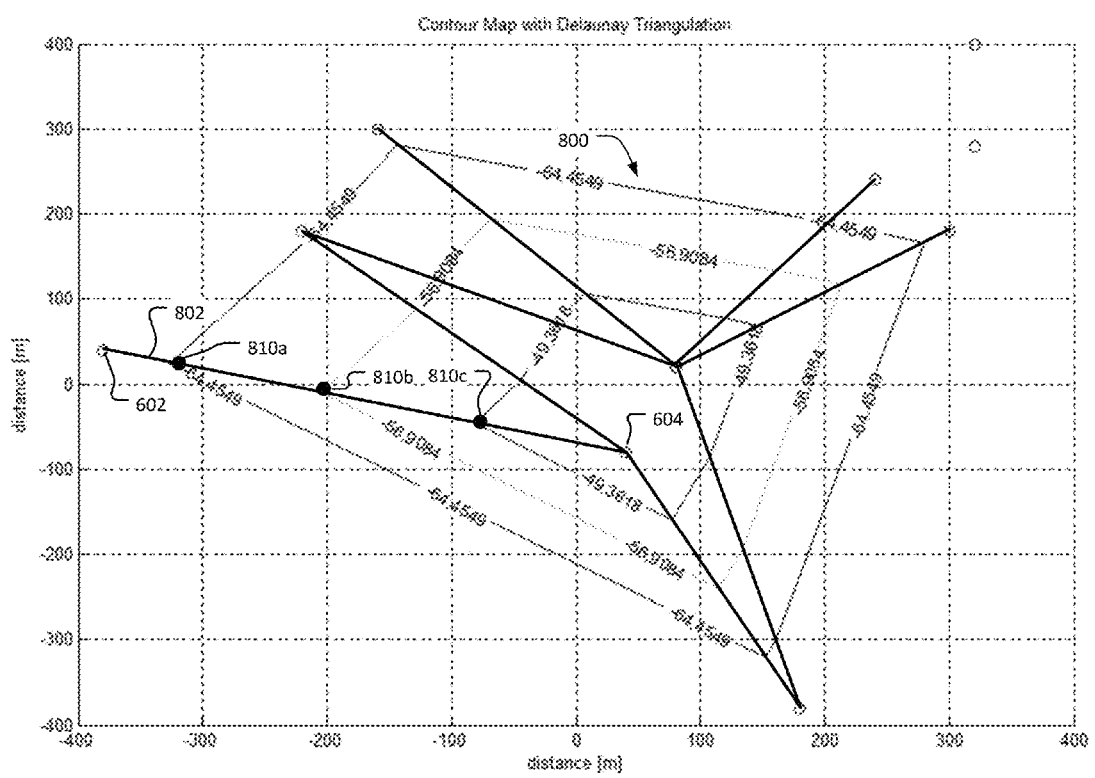
FIG. 8 illustrates mapping contour lines according to an embodiment.

FIG. 8 shows an example of contour values that are generated using such a technique. FIG. 6 shows a lowest signal strength value of −72.00 and a highest signal strength value of −41.82. The difference between −72.00 and −41.82 is 30.18. Using three as the number of contours, the difference between contour divisions is 7.545 (30.18/(3+1)). Therefore the contour step for this example is 7.545. Subtracting 7.545 from −41.82 yields −49.36, which is the approximate value of the highest contour line in FIG. 8. Other contour values of FIG. 8 are determined in a similar fashion.

Contour lines are generated at S514. In an embodiment, generating contour lines includes identifying sides of triangles that pass through one or more contour line. This can be accomplished by identifying each side with a first endpoint that is higher than a contour value and a second endpoint that is lower than the contour value. An example of such sides is shown in FIG. 8.

FIG. 8 shows a triangle side 802 that corresponds to a side of the Delaunay triangles shown in FIG. 7 and the data points of FIG. 6. Side 802 runs between a data point 602 with an RSSI value of −67.72 and data point 604 with an RSSI value of −41.89. All contour line values are within the range of −67.72 to −41.89, so side 802 is identified for generating contour lines.

Identifying sides may be practiced differently in various embodiments. In some embodiments, it may be desirable to only include sides that span all or some portion of contour values. In another embodiment, vertices that include maximum or minimum value data points may be disregarded. Alternatively, some embodiments may discard certain data points before performing Delaunay triangulation. Such an embodiment is more practical when more data points are available.

Triangle sides that pass through at least one contour value may be interpolated to identify points along the line that correspond to contour values. For example, performing linear interpolation on side 802 yields a value of −64.45 at point 810a, a value of −56.90 at point 810b, and a value of −49.36 at point 810c. Similar interpolation is applied to every side shown in FIG. 8, and lines are drawn between points on the sides that correspond to the same contour values. The result is a contour map 800 of interference.

The contour map 800 may be rendered on a graphical media such as a printed paper or a computer display apparatus. The rendered contour map could be used as a graphical representation of a signal strength pattern from the interference source to understand how interference is distributed in a particular geographic area.

Other embodiments may employ different approaches to generate contour lines at S514. For example, the techniques explained above may be supplemented with other known techniques for contour lines. Specifically, radio coverage and planning data may be used in addition or as an alternative to the linear interpolation technique explained above, where sides are interpolated in a non-linear fashion according to terrain elements in a coverage area such as buildings or hills. More complex techniques may employ additional data to improve the accuracy of a contour map 800.

A source of interference may be localized at S516 by averaging coordinate points of one or more contour. In one embodiment, the coordinate points of the contour representing the highest level of interference are averaged, and the location of the average value is interpreted as the location of the interference source. In another embodiment, all contour points for each contour line are averaged to determine the location of the source of interference.

In still another embodiment, the coordinates of some portion of the contour lines are averaged. When the origin lies between two measurement points, actual signal strength values will decrease between a first data point and the origin, and increase from the origin to a second data point defining the other end of the side. Thus, when linear interpolation is applied to the side, error from the interpolation of the side may be higher towards the first date point, which may be a high data point. Other factors may be considered, such as the number of coordinate points that are used to define a contour line, where a higher number of coordinate points may correspond to a more accurate contour line, which in turn may lead to a more accurate determination of an interference source location.

Thus, various embodiments may localize an interference source based on some portion of a plurality of contour lines, such as a highest signal strength contour line, a second highest signal strength contour line, or a combination of some portion of highest signals strength contour lines. In another embodiment, the highest signal strength contour line may not be used to localize interference.

A signal strength contour map and an interference localization result from embodiments of this disclosure are useful for many different applications. For example, system parameters for a wireless radio system may be adapted at S518. When the wireless system is a cellular telecommunications network, frequencies that interfere with signals from the interference map can be avoided for cells that overlap with areas with high levels of interference. In other embodiments, antenna power for base stations that point towards the interference source can be selectively increased, and an antenna pointing direction can be changed.

A result of localizing an interference source can be useful in many contexts. An unknown and possibly illicit interference source may be identified so that it can be eliminated or otherwise mitigated in order to reduce interference to a wireless system. In an embodiment, the interference source could be a beacon that is intended to be located, such as a safety beacon. Persons of skill in the art will recognize that multiple variations are possible within the scope of this disclosure.

What is claimed is:

1. A method for characterizing interference detected by distributed measurement nodes performed by a network resource controller in a wireless communication system, the method comprising:
    collecting signal data from a plurality of measurement nodes, the signal data including a signal strength measurement and a geographic location for the signal strength measurement;
    establishing a triangulated mesh of the geographic locations of the plurality of measurement nodes using Delaunay triangulation to create a plurality of triangles;
    establishing at least one contour by connecting a plurality of coordinates along sides of the plurality of triangles; and localizing a source of the interference by averaging the plurality of coordinates to determine a single geographical coordinate value that corresponds to a location of the source of interference.

2. The method of claim 1, wherein the geographic location includes a latitude coordinate and a longitude coordinate of the corresponding signal strength measurement.

3. The method of claim 2, wherein each signal strength measurement is an average value of a plurality of signal strength measurements.

4. The method of claim 1, wherein the at least one contour is a plurality of contours, the method further comprising:
    rendering the plurality of contours on a graphical media in the form of a contour map of a signal strength pattern.

5. The method of claim 1, wherein establishing the at least one contour includes:
    determining a difference between a high measurement value and a low measurement value;
    determining a number N of contours based on a number of measurements indicating the presence of a signal; and
    determining a contour step by dividing the difference between the high and low measurement values by N.

6. The method of claim 1, wherein establishing the at least one contour includes:
    identifying each triangle side with a first end point that is greater than a first contour level and a second end point that is less than the first contour level; and
    interpolating the identified triangle sides based on the values of the first and second end points.

7. The method of claim 1, wherein the measurements are taken by omnidirectional antennas.

8. The method of claim 1, further comprising:
    adapting a parameter of the wireless communication system based on the at least one contour.

9. The method of claim 8, wherein the wireless communication system parameter is at least one of an antenna pointing direction and a transmit power.

10. A wireless communications system, the system comprising:
    a network resource controller coupled to a backhaul portion of the communications system; and
    a plurality of base stations that transmit signal data to the network resource controller, the signal data including a signal strength value measured by a node chosen from the plurality of base stations and user equipment (UE) attached to at least one of the plurality of base stations, the signal data further including a geographic location where the signal strength value was measured,
    wherein the network resource controller includes a processor that performs the following process steps:
    establishing a triangulated mesh of the geographic locations of the signal data using Delaunay triangulation to create a plurality of triangles;
    establishing at least one contour by connecting a plurality of coordinates along sides of the plurality of triangles; and localizing a source of the interference by averaging the plurality of coordinates to determine a single geographical coordinate value that corresponds to a location of the source of interference.

11. The system of claim 10, wherein the geographic location includes a latitude coordinate and a longitude coordinate of the corresponding signal strength measurement.

12. The system of claim 11, wherein each signal strength value is an average value of a plurality of signal strength measurements.

13. The system of claim 10, wherein the at least one contour is a plurality of contours, and the processor further performs:
   rendering the plurality of contours on a graphical media in the form of a contour map of a signal strength pattern.

14. The system of claim 10, wherein establishing the at least one contour includes:
   determining a difference between a high measurement value and a low measurement value;
   determining a number N of contours based on a number of measurements indicating the presence of a signal; and
   determining a contour step by dividing the difference between the high and low measurement values by N.

15. The system of claim 10, wherein establishing the at least one contour includes:
   identifying each triangle side with a first end point that is greater than a first contour level and a second end point that is less than the first contour level; and
   interpolating the identified triangle sides based on the values of the first and second end points.

16. The system of claim 10, wherein the measurements are taken by omnidirectional antennas.

17. The system of claim 10, further comprising:
   adapting a wireless communication system parameter based on the at least one contour.

18. The system of claim 10, wherein the wireless communication system parameter is at least one of an antenna pointing direction and a transmit power.

\* \* \* \* \*